US008019867B1

(12) United States Patent
Allen et al.

(10) Patent No.: US 8,019,867 B1
(45) Date of Patent: Sep. 13, 2011

(54) SYSTEM AND METHOD FOR TWO WAY COMMUNICATION AND CONTROLLING A REMOTE APPARATUS

(75) Inventors: Christopher Allen, Jamaica Plain, MA (US); Andrew Zupko, Huntsville, AL (US)

(73) Assignee: Brass Monkey Inc., Jamaica Plain, MA (US)

( * ) Notice: Subject to any disclaimer, the term of this patent is extended or adjusted under 35 U.S.C. 154(b) by 0 days.

(21) Appl. No.: 13/042,257

(22) Filed: Mar. 7, 2011

Related U.S. Application Data

(60) Provisional application No. 61/311,102, filed on Mar. 5, 2010, provisional application No. 61/421,977, filed on Dec. 10, 2010.

(51) Int. Cl.
*G06F 15/173* (2006.01)

(52) U.S. Cl. ........ 709/224; 709/220; 709/218; 709/203; 714/2; 700/17; 700/18

(58) Field of Classification Search .................. 709/224, 709/220, 218, 203; 714/2; 700/17, 18
See application file for complete search history.

(56) References Cited

U.S. PATENT DOCUMENTS

| 6,678,246 | B1 | 1/2004 | Smyth |
| 7,143,137 | B2 | 11/2006 | Maufer et al. |
| 7,292,588 | B2 | 11/2007 | Milley et al. |
| 7,493,383 | B1 | 2/2009 | Mukerji |
| 7,664,096 | B2 | 2/2010 | Doherty et al. |
| 7,797,417 | B2 | 9/2010 | Choi |
| 7,818,788 | B2 | 10/2010 | Meier |
| 7,828,654 | B2 | 11/2010 | Carter |
| 7,865,573 | B2 | 1/2011 | Tyhurst et al. |
| 7,890,957 | B2 | 2/2011 | Campbell |
| 2001/0032265 | A1 | 10/2001 | Tanaka |
| 2002/0091831 | A1 | 7/2002 | Johnson |
| 2002/0151327 | A1 | 10/2002 | Levitt |
| 2003/0001883 | A1 | 1/2003 | Wang |
| 2003/0046374 | A1* | 3/2003 | Hilt et al. ...................... 709/220 |
| 2005/0003824 | A1 | 1/2005 | Siris |
| 2005/0015584 | A1 | 1/2005 | Takechi et al. |

(Continued)

FOREIGN PATENT DOCUMENTS

EP 1335535 8/2003

(Continued)

OTHER PUBLICATIONS

AR.Drone User Guide (2010).

(Continued)

*Primary Examiner* — Kyung H Shin
(74) *Attorney, Agent, or Firm* — Greenberg Traurig, LLP; Chinh H. Pham; Seth A. Milman

(57) ABSTRACT

A system for controlling a remotely controlled apparatus includes executing, by a remotely controlled apparatus, a program for controlling actions of the remotely controlled apparatus. The system includes a first network connection between the remotely controlled apparatus and a network hub device configured to extend the range of a computer network may be established. The system also includes second network connection between the network hub device and an endpoint device executing an application for controlling the remotely controlled apparatus may be established. An endpoint device may send data over the first and second network connections for controlling the remotely controlled apparatus. An application executing within a web browser may process the data. A method for controlling a remotely controlled apparatus is also provided.

19 Claims, 6 Drawing Sheets

FIG. 1

U.S. PATENT DOCUMENTS

| | | | |
|---|---|---|---|
| 2005/0138460 A1* | 6/2005 | McCain | 714/2 |
| 2005/0261815 A1 | 11/2005 | Cowelchuk et al. | |
| 2005/0267935 A1 | 12/2005 | Gandhi et al. | |
| 2006/0039356 A1 | 2/2006 | Rao et al. | |
| 2006/0117107 A1 | 6/2006 | Shafron et al. | |
| 2006/0149811 A1* | 7/2006 | Bennett et al. | 709/203 |
| 2006/0152752 A1 | 7/2006 | Yamaguchi et al. | |
| 2006/0267936 A1 | 11/2006 | Hoerl et al. | |
| 2006/0291434 A1 | 12/2006 | Gu et al. | |
| 2007/0088851 A1 | 4/2007 | Levkovitz et al. | |
| 2007/0088852 A1 | 4/2007 | Levkovitz | |
| 2007/0100514 A1 | 5/2007 | Park | |
| 2007/0198144 A1 | 8/2007 | Norris et al. | |
| 2008/0167732 A1* | 7/2008 | Slavin et al. | 700/17 |
| 2008/0183307 A1 | 7/2008 | Clayton et al. | |
| 2008/0229095 A1 | 9/2008 | Kalimuthu | |
| 2008/0261686 A1 | 10/2008 | Bedingfield | |
| 2008/0291916 A1 | 11/2008 | Xiong et al. | |
| 2008/0312782 A1 | 12/2008 | Berdichevsky et al. | |
| 2009/0055749 A1 | 2/2009 | Chatterjee et al. | |
| 2009/0060452 A1 | 3/2009 | Chaudhri | |
| 2009/0062014 A1 | 3/2009 | Gift et al. | |
| 2009/0135765 A1 | 5/2009 | Lewis et al. | |
| 2009/0153289 A1 | 6/2009 | Hope et al. | |
| 2009/0199259 A1 | 8/2009 | Alao et al. | |
| 2009/0199275 A1 | 8/2009 | Brock et al. | |
| 2009/0248542 A1 | 10/2009 | Houvener et al. | |
| 2009/0300137 A1 | 12/2009 | Tyhurst et al. | |
| 2009/0319644 A1 | 12/2009 | Fagioli et al. | |
| 2010/0023338 A1 | 1/2010 | Petronelli et al. | |
| 2010/0184422 A1 | 7/2010 | Ahrens | |
| 2010/0267448 A1 | 10/2010 | Snoddy et al. | |
| 2010/0299436 A1 | 11/2010 | Khalid et al. | |
| 2011/0009193 A1 | 1/2011 | Bond et al. | |

FOREIGN PATENT DOCUMENTS

| | | |
|---|---|---|
| WO | WO 2009/055717 | 4/2009 |
| WO | WO 2010/062617 | 6/2010 |
| WO | WO 2010/0088313 | 8/2010 |
| WO | WO 2010/093831 | 8/2010 |
| WO | WO 2010/112839 | 10/2010 |

OTHER PUBLICATIONS

Schulzrinne, H., et al., "Real Time Streaming Protocol (RTSP)", Network Working Group, pp. 1-92, (Apr. 1998).

PCT International Search Report based on International Application No. PCT/US2011/027431 dated Apr. 28, 2011.

PCT International Search Report based on International Application No. PCT/US2011/027429 dated Apr. 29, 2011.

PCT International Search Report based on International Application No. PCT/US2011/027294 dated May 6, 2011.

PCT International Search Report based on International Application No. PCT/US2011/027295 dated May 9, 2011.

Office Action in U.S. Appl. No. 13/041,951 mailed Jun. 2, 2011.

Office Action in U.S. Appl. No. 13/042,286 mailed Jun. 10, 2011.

* cited by examiner

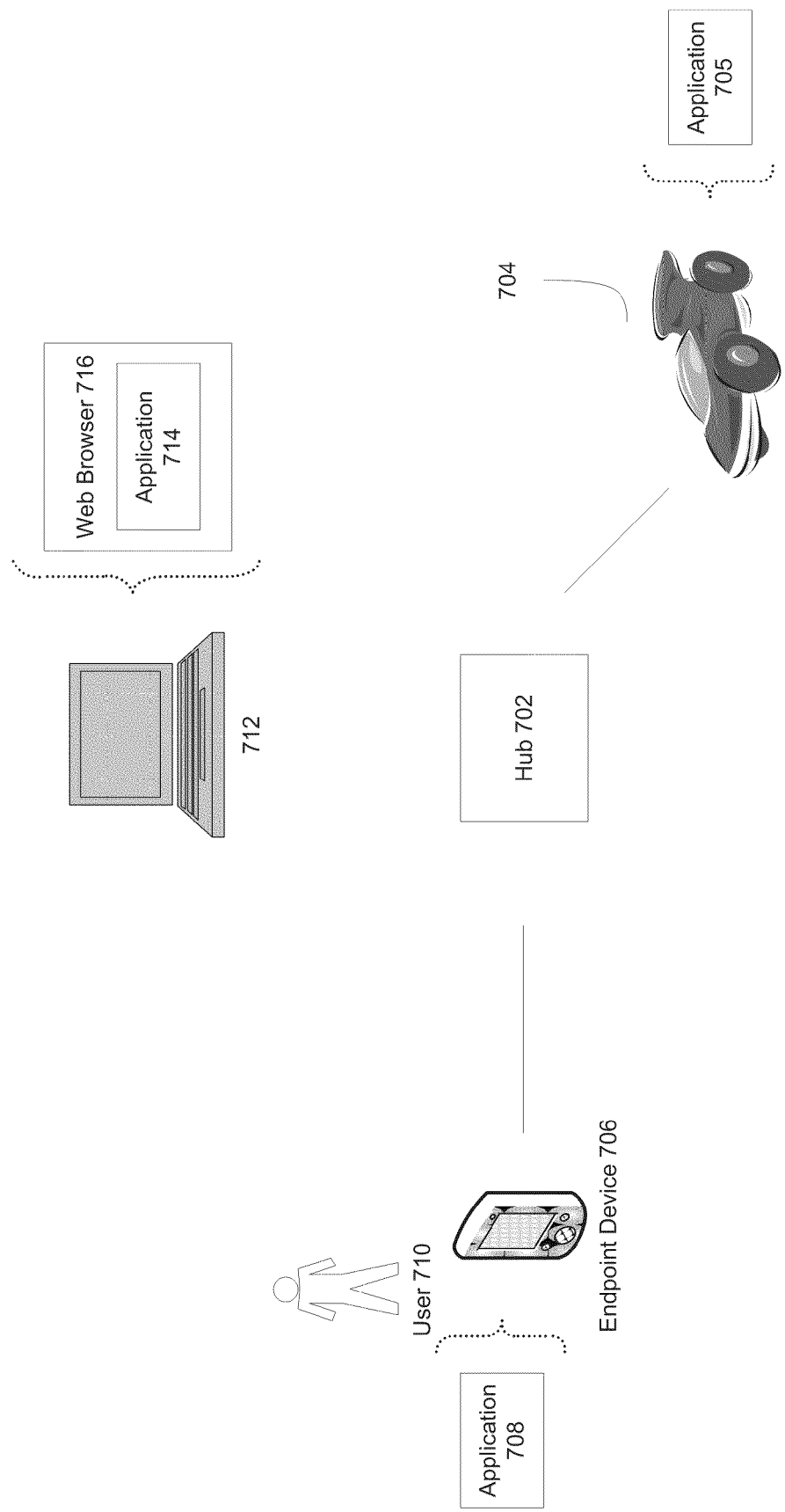

SYSTEM AND METHOD FOR TWO WAY COMMUNICATION AND CONTROLLING A REMOTE APPARATUS

CROSS-REFERENCE TO RELATED APPLICATIONS

This application claims priority to and benefit of Provisional Patent Application Ser. No. 61/311,102, filed on Mar. 5, 2010, and to Provisional Patent Application Ser. No. 61/421,977, filed on Dec. 10, 2010. Both applications 61/311,102 and 61/421,977 are incorporated herein by reference in their entirety.

TECHNICAL FIELD

This invention relates generally to the field of communication over a network, and more particularly, to communication between an application and a remote apparatus.

BACKGROUND

With the rise of mobile computing, more and more devices are able to connect to computer networks. Network communication is no longer limited to PCs and laptops. Mobile phones and smart phones can typically connect not only to mobile telephone networks, but also Wi-fi networks, Bluetooth® networks, USB networks, etc. Other devices, which historically were not able to connect to computer networks, are entering the market already configured to access the internet. Televisions, DVD players, and even home appliances have network and internet capability.

Mobile applications have also become increasingly popular. Smart phones, such as the iPhone® device, Android® phones, or Blackberry®phones can download and run a broad array of different applications, from games and movie players to productivity and work tools.

Browser applications are attractive to developers because they can be relatively easy to develop and deploy. Browser applications also provide dynamic and customizable content for display within a web browser. A browser application developer could create, for example, a video game or media presentation application that can run within a web browser.

Browser applications, such as FLASH® applications, Unity™ applications, JavaScript® applications, and the like, can be downloaded and run by a web browser without the need to install the application directly onto a local computer. Rather, a user can run a browser application simply by directing his or her browser to a URL that provides a browser application. The web browser will then load and execute the browser application directly, downloading it just as if the user were viewing a static web page. Many browser applications are game applications that users can connect to, control, and play for entertainment.

However, browser applications are typically subject to security restrictions. Web browsers often employ a security scheme, sometimes called sandbox security, that restricts browser applications from accessing resources on the local machine. For example, web browsers will often prevent browser applications from accessing files on the local hard drive, operating system resources, etc. Web browsers may also prevent browser applications from communicating over a network, such as a local or wide area network connected to the local machine.

Unfortunately, because of a security mechanism of a web browser, it may be difficult for a mobile device to establish a low latency network connection with a remote apparatus.

BRIEF SUMMARY OF THE INVENTION

In an embodiment, a method of controlling a remotely controlled apparatus includes executing, by a remotely controlled apparatus, a program for controlling actions of the remotely controlled apparatus. A first network connection is established between the remotely controlled apparatus and a network hub device configured to extend the range of a computer network. A second network connection is established between the network hub device and an endpoint device executing an application for controlling the remotely controlled apparatus. The handheld endpoint device may send data over the first and second network connections for controlling the remotely controlled apparatus. An application executing within a web browser may process the data.

In another embodiment, a system includes a remotely controlled apparatus in communication with a computer network. A network hub may be configured to extend the range of the computer network and establishing a first network connection with the remotely controlled apparatus. An endpoint device may execute an application configured to establish a second network connection with the network hub device and send data over the first and second network connections for controlling the remotely controlled apparatus. An application executing within a web browser on a computing device may collect and process the data.

BRIEF DESCRIPTION OF THE DRAWINGS

FIG. 7 is a block diagram of an embodiment of the invention for controlling a remotely controlled apparatus.

DETAILED DESCRIPTION OF THE EMBODIMENTS

The present invention may provide a system and method for connecting devices over a network. More particularly, the present invention may be used to connect and facilitate communication between a browser application running within a web browser and an application executing on an endpoint device.

Web browsers often employ security schemes, sometimes referred to as sandbox security, to ensure that browser applications cannot cause harm to a local machine. These security schemes may restrict a browser application from using local machine resources, such as the hard drive of the computer, I/O, or networking capabilities.

Typically, devices on a network can discover other devices on the network by broadcasting their presence on the network, and monitoring broadcasts from other devices. However, if a browser application, for example a FLASH application, is running within a web browser on a machine connected to a network, the security mechanisms of the web browser may prevent the browser application from discovering or communicating with other device connected to the network, even if those other devices are running applications that could otherwise communicate or interact with the browser application.

System Architecture

Figure 1:
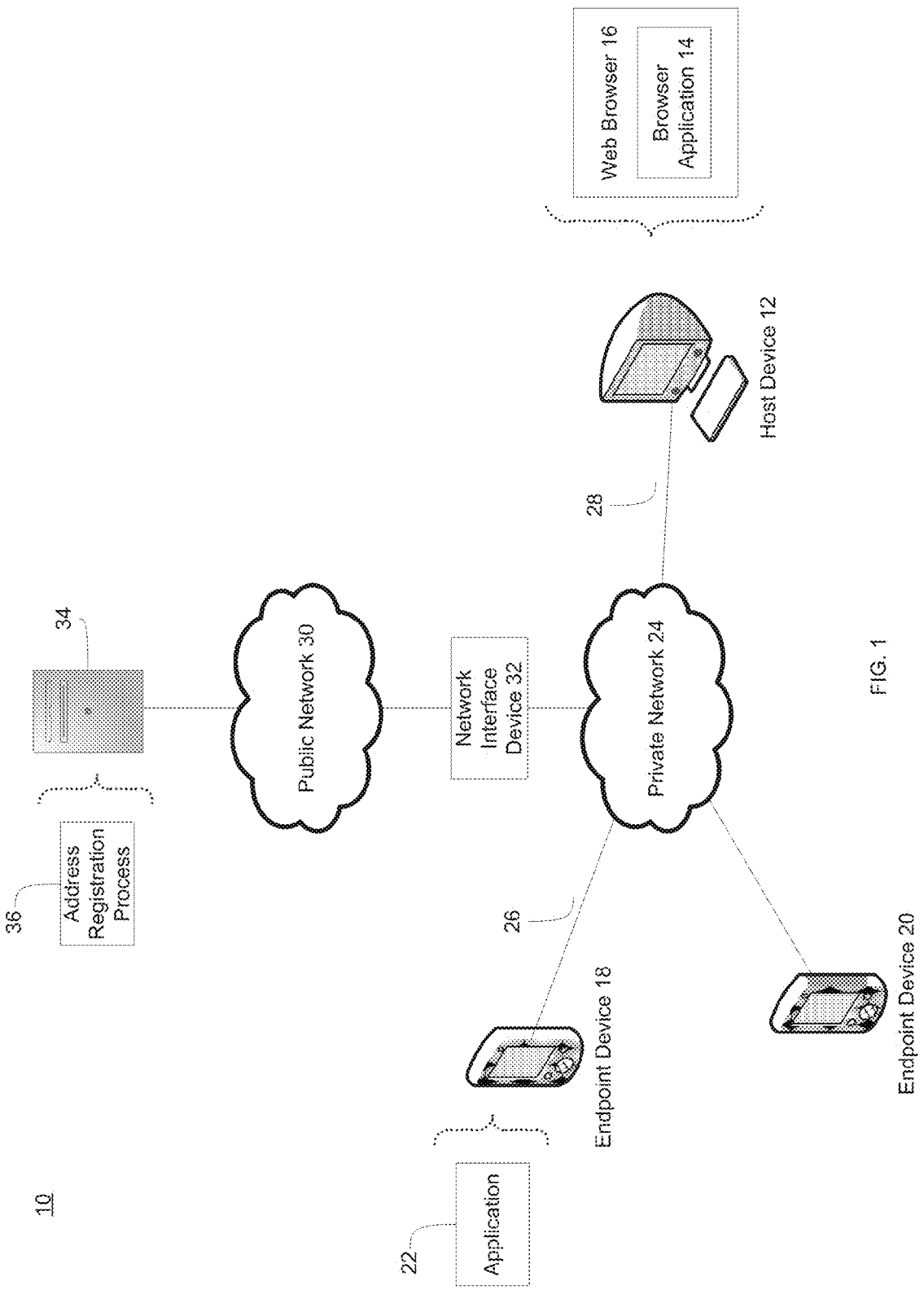
FIG. 1 is a block diagram of an exemplary computer network architecture suitable for operation of the present invention.

Referring now to FIG. 1, in an embodiment, the present invention provides a system and architecture 10 for controlling content within a web browser. The system may include host device 12, which may execute browser application 14 within web browser 16.

FIG. 1 shows host device 12 as a desktop computer, however host device 12 is not limited to desktop computers. For example, host device 12 may be a laptop computer, server computer, game console, mobile device, smart phone, internet television, home appliance, network- and processor-enabled remotely controlled toy, internet enabled billboard, medical display device, iPad®, or any other device capable of running browser application 14 within web browser 16.

FIG. 1 also shows endpoint devices 18, 20. Endpoint device 18 may execute application 22, which may be an application configured to communicate with browser application 14. Endpoint device may typically be a network-enabled wireless handheld device, such as a PDA or smart phone, and application 22 is typically a mobile application. However, endpoint device may also be any type of device capable of running application 22 and connecting to private network 24, such as a laptop or desktop computer, a gaming console, a game controller, etc.

Endpoint device 20 may be another endpoint device within system 10. Endpoint device 20 is depicted here in FIG. 1 merely to show that other devices may be included within system 10 and connected to private network 24. Although not shown, endpoint device 20 may execute an application such as application 20, may execute other applications capable of communicating with browser application 14, or may execute applications capable of communicating with other browser applications, for example.

Host device 12 and endpoint devices 18, 20 may be connected to private network 18. Private network 18 can typically be a local are network (LAN), but may also be other types of networks, including but not limited to, a wired LAN, one or more LAN segments, a wireless LAN, a wide area network, a Bluetooth® network, a USB network, etc. Accordingly, connections 26, 28 may be wired or wireless connections and may employ any appropriate communication technologies and protocols to enable communication between the devices.

Private network 24 may also comprise multiple networks coupled together, multiple LAN segments, etc. For the sake of simplicity, this disclosure will describe private network 24 as a wired/wireless Ethernet LAN, typical of internet enabled households and businesses. Wired/wireless routers, such as those provided by Linksys® and other companies, can provide such a network. However, one skilled in the art will recognize that the inventions herein may operate within various different types of network topologies.

Private network 24 is shown as separated from public network 30 by network interface device 32. Public network 30 may be any type of LAN or WAN. In this example, public network 30 may represent a public network such as the internet.

Network interface device 32 may provide a bridge between private network 24 and public network 30, and also may provide a security barrier between private network 24 and the internet, such as a firewall. Typical examples of network interface device 32 are cable modems, DSL modems, T1 connections, and the like. Devices connected to public network 30 (i.e. the internet) typically cannot penetrate the security barrier of network interface device 32 to discover or communicate with devices on private network 32. However, in an embodiment, network interface device 32 may allow devices on private network 24 to access public network 30 so that they can browse the internet, download applications, and communicate with devices on the internet. Network interface device 32 may be a single network interface device, or may be multiple network interface devices that provide multiple access points between private network 24 and the internet.

Devices connected to private network 24 may receive a private network address, while devices connected to public network 30 may receive public network addresses. A private network address is an address specific to private network 24. Devices that receive a private network address from private network 24 can typically communicate freely with other devices on private network 24. However, devices on public network 30 typically cannot discover or communicate with devices on private network 24 having private network addresses because of the security mechanisms in network interface device 32. A typical example is a home or business LAN, where devices on the LAN can communicate with each other, and can access the internet, but devices on the internet cannot discover or initiate communications with the devices on the LAN.

Since network interface device 32 is connected to public network 30, network interface device may receive a public network address. A public network address is an address that can be accessed by devices on public network 30 and/or private network 24. Since, in this example, public network 30 represents the internet, the public network address received by network interface device is a public internet address, which can be accessed by other devices on the internet. The opposite may also be true.

In other words, devices on public network 30 (i.e. internet devices) can "see" network interface device 32 and its public network address, but they cannot "see" devices on private network 24. Devices on private network 24 can not only "see" the other devices on private network 24 and access them using their private network addresses, they can also "see" devices on public network 30 and access them using their public network addresses.

FIG. 1 also shows server 34, which is executing address registration process 36. Server 34 can be any type of computing device or group of devices capable of executing address registration process 36. Typically, server 34 is a server computer, an internet server, a group of servers, a cluster of servers, or any configuration of server computers.

System 10 shows a typical configuration for the inventions described herein. However, system 10 is not the only architecture within which the inventions described herein can operation. One skilled in the art will recognize that various system architectures can support the systems, methods, and apparatuses described herein. Also, although not shown, any of the applications and processes may be run by any computing device within system 10, or by any computing device capable or running the applications and processes. For example, host device 12 may execute address registration process 36 and/or application 22; endpoint devices 18, 20 may execute web browser 16, browser application 14, and or address registration process 36; and server 34 may execute web browser 16, browser application 14, and/or application 22.

As discussed, since browser application 14 is running within the security scheme of web browser 16, browser application 14 may not be able to discover or communicate with application 22, and application 22 may not be able to discover or communicate with browser application 14.

Computer Processing Device

Figure 2:
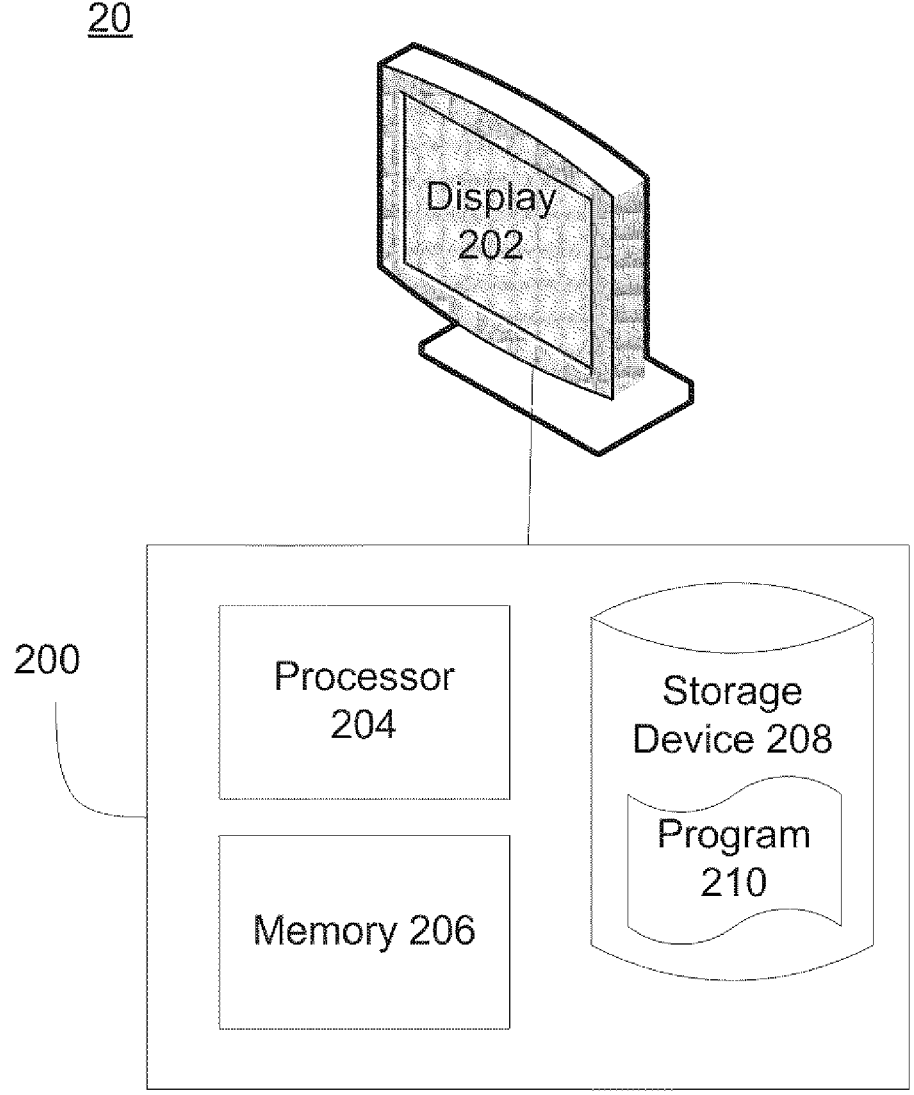
FIG. 2 is a block diagram of a computer processing device.

The present inventions may be implemented as hardware, software, or a combination of hardware and software. FIG. 2 shows a block diagram of a typical processing architecture, which may execute software applications and processes. Computer processing device 200 is coupled to display 202 for graphical output. Processor 204 is a computer processor capable of executing software. Typical examples are computer processors (such as Intel® or AMD® processors), ASICs, microprocessors, and the like. Processor 204 is coupled to memory 206, which is typically a volatile RAM memory for storing instructions and data while processor 204 executes. Processor 204 is also coupled to storage device 208, which is a non-volatile storage medium, such as a hard drive, FLASH drive, tape drive, DVDROM, or similar device. Program 210 is a computer program containing instructions and/or data, and is stored on storage device 208. In a typical scenario, processor 204 may load some or all of the instructions and/or data of program 210 into memory 206 for execution. Program 210 can be any computer program or process including, but not limited to web browser 16, browser application 14, address registration process 36, application 22, or any other computer application or process.

Program 210 may include various instructions and subroutines, which, when loaded into memory 206 and executed by processor 204 cause processor 204 to perform various operations, some or all of which may effectuate the methods associated with the present inventions.

Although not shown, computer processing device 200 typically includes various forms of input and output. The I/O may include network adapters, USB adapters, Bluetooth radios, mice, keyboards, touchpads, displays, touch screens, LEDs, vibration devices, speakers, microphones, sensors, or any other input or output device for use with computer processing device 200.

Content Control Process

Figure 3:
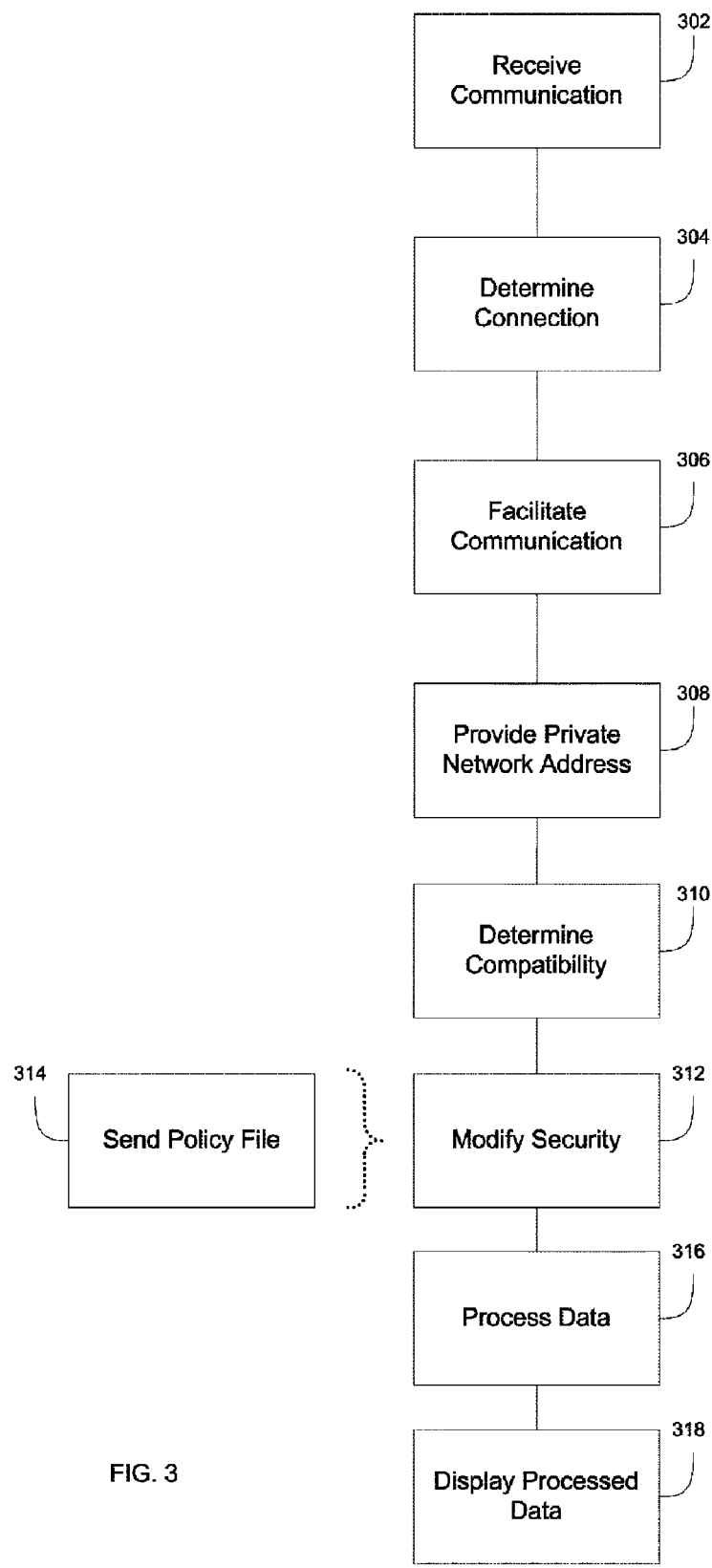
FIG. 3 is a flowchart depicting a method for use in connection with the present invention.

FIG. 3 shows a flowchart diagram that depicts a process for controlling content and/or establishing two-way communication within a web browser. The process may be implemented as software executing on one or more devices. For example, the process may run on host device 12, endpoint devices 18, 20, server 34, or any combination thereof. The process may also be implemented on any other capable device or in any appropriate architecture.

In an embodiment, the content control process may operate to control content within a web browser and/or engage in two-way communication with an application running within a web browser. In a specific embodiment, the process may facilitate connectivity and two-way communication between browser application 14 and application 22, and allow application 22 to control web browser content displayed by browser application 14. In one example, browser application 14 is a video game downloaded by a user. The video game runs as a browser application (e.g. a FLASH application) within web browser 16, and is subject to the security restrictions of web browser. In the same example, application 22 running on endpoint device 18 is a game controller application downloaded by the user. The controller application acts as a game controller and allows the user to control and/or play the FLASH game. The user may wish to connect the game controller application to the video game so he or she can play. However, since the video game is executing within the security schema of web browser 16, the controller application and the video game may not be able to discover and communicate with each other.

In order for the applications to communicate, server 34 (and/or address registration process 36) may receive 302 a communication from application 22, which is running on endpoint device 18. In one embodiment, application 22 may send the communication in order to register its addresses with server 34. Accordingly, the communication may include private network address of endpoint device 18 (i.e. the private network address within private network 24), and may also include the public address of endpoint device 18. In this example, since network interface device 32 is the bridge between private network 24 and public network 30, public network address of endpoint device 18 may match, at least in part, the public network address of network interface device 32.

In some cases, the communication may also contain an application ID. Application 22 may have an application ID that it sends to server 34 along with the public and private network addresses.

Browser application 14 (running within browser 16 on host device 12) may also send a communication to server 34. Similarly, the communication from browser application 14 may serve to register browser application 14 with address registration process 36. The communication may contain the public network address of host device 12, and may also contain an application ID that uniquely identifies browser application 14. In this case, as discussed above, the public network address of host device 12 may match, in whole or in part, the public network address of network interface device 32, since network interface 32 provides the interface between host device 12 and public network 30. In some embodiments, the communication from browser application 14 and/or from application 22 also contains other information, such as the private network address of host device 12, other information about host device 12, application data, user data, or any other type of information.

Figure 4:
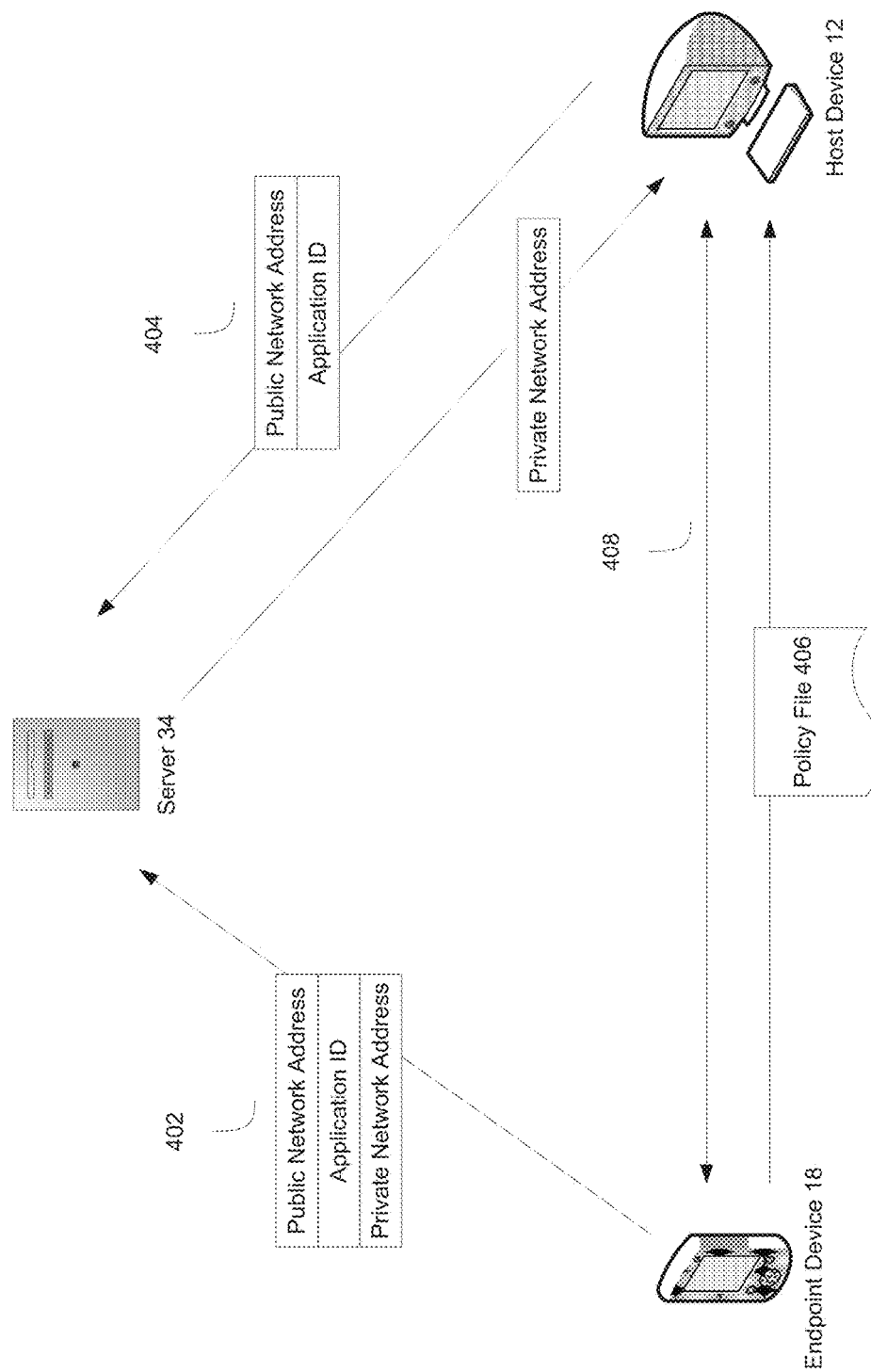
FIG. 4 is a block diagram illustrating some of the operations of the present invention.

FIG. 4 shows a an example of the communications between endpoint device 18, host device 12, and server 34. As shown, communication 402 includes the public and private network addresses of endpoint device 18, and an application ID of application 22. Similarly, communication 404 contains the public network address of host device 12 and the application ID of browser application 14\. The opposite may also be true.

Server 34 may receive communications from other endpoint devices and host devices (not shown). In one embodiment, server 34 is an internet server that receives communications (include network addresses and application IDs) from devices connected to various private networks throughout cyberspace. Server 34 may record and catalog the information it receives from these various devices in, for example, a database or other data store.

Upon receipt of the communications, server 34 may determine 304 whether endpoint device 18 and host device 12 are connected to the same local network based upon the public network addresses within the communications. As described above, the public network address is typically associated with a public-facing device connected to the local network. In FIG. 1, that device is network interface device 32. Therefore, in this example, when server 34 receives communication 402 from endpoint device 18, the public network address may indicate that endpoint device 18 is connected to private network 24 since the communication is being routed through network interface device 32. Similarly, the public network address in communication 404 from host device 12 may indicate that host device 12 is connected to private network 24 and that communication 404 is being routed through network interface device 32.

By comparing the public network address of various devices in this way, server 34 can determine which devices are connected to the same private networks. The public network addresses may match, in whole or in part, or may otherwise be related. For example, server 34 may determine that two devices are connected to the same private network if the public network addresses of the two devices match. In another example, server 34 may determine that two devices are connected to the same private network if the public network addresses of the two devices have the same subnet address. Server 34 may also contain a lookup table or other device that provides information about which public network addresses are associated with various private networks. By utilizing the lookup table or other mechanism, server 34 may determine whether received public network addresses indicate that devices are connected to the same private network.

System 10 may also facilitate a network connection between browser application 14 and application 22 by providing 308 the private network address of endpoint device 18 to browser application 14. As discussed above, browser application 14 and application 22 may not be able to connect or communicate with each other if the security mechanisms of web browser 16 prevent such communication. For example, the security mechanisms of web browser 16 may prevent browser application 14 and from broadcasting its presence on private network 24. Similarly, the security mechanisms of web browser 16 may prevent browser application 14 from receiving broadcasts from application 22.

However, browser application 14 may be able to communicate directly with application 22 if browser application 14 knows the private network address of endpoint device 18. By providing the private network address of endpoint device 18 to browser application 14, the system may be able to modify the security policy of web browser 16 to allow communication between browser application 14 and application 22.

In some embodiments, address registration process 36 and/or server 34 will provide the private network address of endpoint device 18 to browser application 14 only if application 22 and browser application 14 are compatible applications. For example, if address registration process 36 determines 310 that browser application 14 is a game application and application 22 is a controller application for that game, then address registration process 36 may determine that application 22 and browser application 14 are compatible applications and send the private network address of endpoint device 18 to browser application 14, so that browser application 14 and application 22 can communicate with each other. However, if browser application 14 and application 22 are not compatible, then address registration process may not send the private network address to browser application 14. For example, if browser application 14 is a video game, but application 22 is an application for drawing pictures, then they are likely not compatible. In this case, there may be no need to send the private network address of endpoint device 18 to browser application 14 in order to initiate communication between browser application 14 and application 22.

Address registration process 36 may determine 310 whether applications are compatible in various ways. In one embodiment, address registration process 36 may compare the application IDs received from application 22 and browser application 14. If the application IDs indicate the applications are compatible, address registration process may provide 308 the private network address of endpoint device 18 to browser application 14. The application IDs may indicate the applications are compatible if the application IDs match, for example. In other embodiments, the application IDs may indicate compatibility if they are associated in some other way. For example, address registration process 36 may have a lookup table or hash table of application IDs that links compatible application IDs.

The application IDs may be any unique identifier and may include information such as a code representing the application and/or its version number, the name of the application, etc. The opposite may also be true.

In some embodiments, address registration process 36 may provide 308 the private network address to browser application 14 in various ways. In one embodiment, browser application 14 may periodically poll address registration process 36 and ask for the address. Upon receipt of the request, address registration process 36 may send browser application 14 a list of the private network addresses of all endpoint devices that are running compatible applications and connected to private network 24. In another embodiment, address registration process 36 may send the private network address of an endpoint device to browser application 14 whenever an endpoint device running a compatible application and connected to private network 24 registers with address registration process 36. In yet another embodiment, address registration process 36 may periodically broadcast lists of private network addresses, which can be retrieved by browser application 14 whenever appropriate. Other schemes of providing 308 the private network addresses to browser application 14 may also be employed.

If the security of web browser 16 prevents communication between browser application 14 and application 22, then the system may modify 312 the security policy of web browser 16 to allow for the communication. For example, endpoint device 18 may send 314 a policy file to host device 12.

Referring to FIGS. 3 and 4, in one embodiment, endpoint device 18 may send 314 policy file 406 to host device 12 by serving the policy file through a web server. Endpoint device 18 may execute a web server application, which may be incorporated into application 22, or may be a standalone or off-the-shelf web server application. Typical off-the-shelf web server applications include the Apache® web server, Microsoft IIS® web server, etc. One skilled in the art will recognize that other devices, such as endpoint device 20 or server 34, may also execute the web server application and send 314 the policy file 406 to host device 12.

Upon receipt of the private network address of endpoint device 18, browser application 14 may access the web server executing on endpoint device 18 and download policy file 406. Policy files are typically known in the art. In this example, policy file 406 may contain a new security policy for web browser 16 or changes to the security policy of web browser 16 that allow for communication between browser application 12 and application 22. When browser application 14 receives policy file 406, it may apply the policy file to the security policy of web browser 16 to allow for such communication.

In another embodiment, the security policy of web browser 16 may be modified 312 through an HTML5 handshake. HTML5 handshakes are also typically known in the art. In this case, application 22 and browser application 14 may perform the HTML5 handshake in order to modify the security profile of web browser 16 and allow communication between browser application 14 and application 22.

Network Communication

In some embodiments, the methods and systems may facilitate communication between browser application 14 and application 22. As discussed, web browser 16 may include security mechanisms that prevent browser application 14 from discovering or communicating with endpoint devices 18, 20 over private network 24. To facilitate communications, application 22 may send the private network address of endpoint device 18 to one or more network-enabled devices.

In the example above, application 22 may send the public and/or private network address of endpoint device 18, and/or an application ID to server 34. However, one skilled in the art will recognize that application 22 may send such information to any device, or may broadcast such information to any device, in order to facilitate communications between application 22 and browser application 14. Similarly, browser application 14 may send the public network address of host device 12, the private network address of host device 12, and/or an application ID to server 34 in order to facilitate communication with application 22. However, on skilled in the art will recognize that browser application 14 may send such information to any device, or may broadcast such information to any device, in order to facilitation communications between application 22 and browser application 14.

In an embodiment, application 22 and/or browser application 14 may establish socket connections in order to facilitate communications. As used herein, the term socket refers to any unidirectional or bidirectional inter- or intra-process data or communication flow over a network. The socket connections may be initiated by application 22, browser application 14, or both. The socket connections may be any continuous or intermittent communication connections between application 22 and browser application 14 through private network 24.

In various embodiments, browser application 14 and application 22 establish one or more socket connections, and are the endpoints of the socket connections. However, various other devices (such as endpoint device 20 and/or an application running on endpoint device 20) may establish the socket connections and may also be endpoints in the socket connections. In some embodiments where multiple devices are involved in communication, more than two devices can communicate over the socket connections.

Browser application 14 and/or application 22 may first initiate the socket connections, which may each provide communication flow from browser application 14 to application 22, from application 22 to browser application 14, or both.

Figure 5:
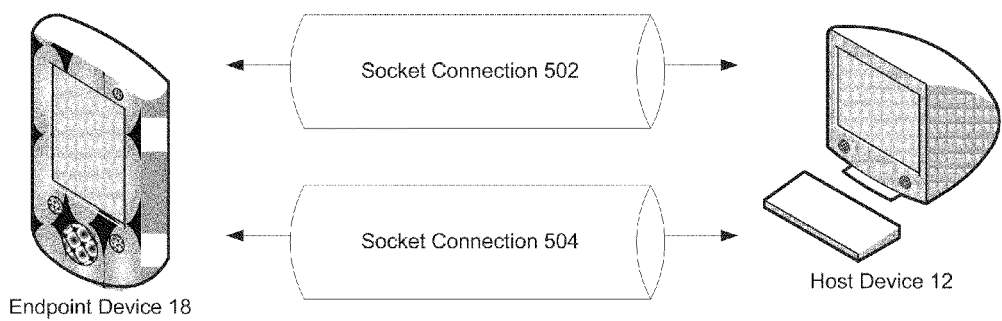
FIG. 5 is a block diagram illustrating network connections.

Referring to FIG. 5, upon receipt of the private network address of endpoint device 18 and upon initiation of communications, browser application 14 and/or application 22 may establish a socket connection 502 and second socket connection 504 between browser application 14 and application 22. Although FIG. 5 shows only two socket connections, one skilled in the art will recognize that the applications may also establish additional socket connections to facilitate communications.

In one embodiment, socket connection 502 may be a TCP connection. As known in the art, TCP is a reliable communication protocol. The TCP protocol provides features that limit packet and data loss between endpoints, as well as features that ensure packets are received and/or processed in a correct order. Accordingly, browser application 14 and application 22 may send loss-sensitive data over socket connection 502. As an example, if browser application 14 is a game and application 22 is a game controller application, loss-sensitive data may include control data such as button presses, command acknowledgements, control data, setup and initiation data, etc. In general, the data sent over socket connection 502 may be any data that the application deems to be loss-sensitive. In other words, any data where the absence of receipt of the data on the receiving end of the socket could cause problems, inconsistencies, or bugs in the application may be deemed loss-sensitive data and sent over socket connection 502.

Socket connection 504 may be a UDP connection, for example. As known in the art, UDP is an unreliable communication protocol and does not include mechanisms to ensure receipt of data. Accordingly, browser application 14 and application 22 may send loss-tolerant data over socket 504. Loss-tolerant data may include any type of data where the loss of at least some of the data will not cause problems, inconsistencies, or bugs in the application. Typical examples of loss-tolerant data include streaming video, streaming audio, etc. These types of data are considered loss-tolerant because, if some of the data are not received, the audio or video stream may not be significantly interrupted. In some embodiments, other types of data, such as accelerometer measurements from a smart phone, are considered loss-tolerant data and are sent over socket 504.

Figure 6:
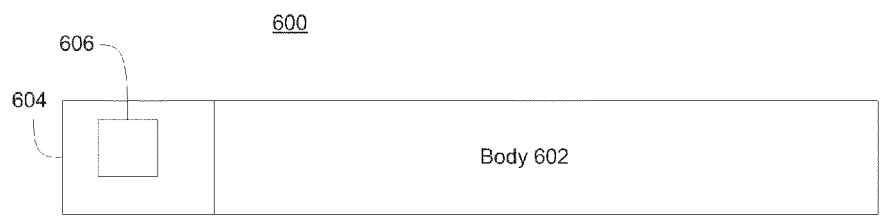
FIG. 6 is a block diagram illustrating a packet.

Application 14 and/or browser application 22 may generate network packets for transmission over sockets 502, 504 by using pre-constructed packet headers and/or pre-constructed packet templates. Referring to FIG. 6, packet 600 may be a network packet for transmission over socket 502 or socket 504. Packet 600 may include a body 602, which may contain a data payload, and a header 604, which may contain routing and other information concerning the transmission of packet 600 over the network. In some embodiments, header 604 may include indicator 606, which may identify whether packet 600 contains loss-sensitive traffic and should be routed over socket 502, or contains loss-tolerant traffic and should be routed over socket 504. Indicator 606 may be any data type known in the art capable of indicating how packet 600 should be routed.

Packet 600 may be constructed through the use of pre-constructed packet headers and/or pre-constructed packet templates. For example, if the data payload of packet 600 contains loss-sensitive data, packet 600 may be generated using a pre-constructed packet template designed to ensure packet 600 is routed over socket 502 (the TCP socket) once it enters a network stack for transmission and routing. Similarly, if the data payload of packet 600 contains loss-tolerant data, packet 600 may be generated using a pre-constructed header or template designed to ensure packet 600 is routed over socket 504 (the UDP socket) once it enters a network stack for transmission and routing. Of course, the opposite may also be true.

In some embodiments, the header or template used to generate packet 600 may determine the value of indicator 606, and whether indicator 606 will indicate whether packet 600 should be routed over socket 502 or socket 504. Accordingly, once packet 600 enters a network stack for transmission and routing, application 22 and/or browser application 14 may read indicator 606 and/or a data type encoded within header 604 or indicator 606, and may route packet 600 over socket 502 or socket 504 as appropriate.

During development, an application developer may decide what types of application data are loss-tolerant and what types are loss-sensitive. In this case, the developer may determine which pre-constructed header to use for different types of data. Additionally/alternatively, browser application 14 and application 22, or a development environment used to create browser application 14 and/or application 22, may provide defaults for particular data types. For example, browser application 14 and application 22 may, by default, use a pre-constructed header for loss-tolerant data whenever they send streaming audio or streaming video data over the network to each other. One skilled in the art will recognize that various defaults may be employed so that particular types of data are routed over the appropriate type of socket connection.

Routing loss-tolerant data over socket connection 504 and loss-sensitive data over socket connection 502 may result in reduced latency and more efficient network communication between application 22 and browser application 14. For example, by sending loss-tolerant data (such as streaming video) over socket 504 (the UDP connection), the protocol stacks of application 22 and browser application 14 may become less clocked. Also, reserving socket 502 (the TCP connection) for loss-sensitive, but less voluminous data, such as command and control data, may also reduce the possibility of a network stack bottleneck.

Although the descriptions above provide examples with a single endpoint device, a single host device, and a single server, one skilled in the art will recognize that any combination employing single or multiple devices are possible. Any combination of single or multiple endpoint devices, single or multiple host devices, and/or single or multiple address registration server devices may fall within the scope of the invention. For example, multiple endpoint devices may connect to a single host device, a single endpoint device may connect to a single host device, single or multiple host and/or endpoint devices may communicate with single or multiple address registration server devices, etc. Other combinations are also within the scope of the invention.

Furthermore, browser application 14 and application 22 may be compatible applications designed to communicate with each other. For example, browser application 14 may be a game and application 22 may be a game controller application designed to be compatible with one another. Similarly, browser application 14 and application 22 may be the same application, e.g., they may be the same game running on different platforms and communicating, for example, in a head-to-head match. Additionally/alternatively, browser application 14 and application 22 may be different applications that can communicate with each other over the network.

Control of Remote Apparatus Example

The following example shows one embodiment of the present invention, which may provide for control of a remote apparatus.

FIG. 7 shows a block diagram of an embodiment of the invention. In FIG. 7, all the devices shown, i.e. hub 702, remotely controlled apparatus 704, endpoint device 706, and computing device 708 may be connected to the same network, such as private network 24 in FIG. 1. In other embodiments, the opposite may be true.

Hub 702 may be a network hub or extender positioned in a location to extend the range of the network. For example, if the network is a wireless network, the network may have a limited range and, if outside the range, endpoint device 706 and remotely controlled apparatus 704 may not be able to communicate. If so, hub 702 may be placed in a physical position so as to extend the range of the network and allow endpoint device 706 and remotely controlled apparatus 704 to communicate. In this case, endpoint device 706 and remotely controlled apparatus 704 may communicate with each other through hub 702.

Remotely controlled apparatus 704 may be a remotely controlled car (as shown), a remotely controlled toy, a remotely controlled vehicle, a remotely controlled ground or air based military robot, a remotely controlled manufacturing arm, or any other type of remotely controlled apparatus. Remotely controlled apparatus 704 may be in communication with the network in order to communicate with other devices. Remotely controlled apparatus 704 may execute application 705, which may be configured to receive data for controlling remotely controlled apparatus 704. In some embodiments, application 705 may run within a web browser executing on remotely controlled apparatus 704. Whether or not application 705 is running within a web browser, application 705 may send a communication to an address registration server (as described above) to facilitate connection with other devices on the network.

Endpoint device 706 may be any type of computing device, including a smart phone, a desktop computer, a laptop computer, etc. Endpoint device 706 may execute application 708, which may be an application configured to control remotely controlled apparatus 704. When user 710 wishes to control remotely controlled apparatus 704, user 710 may provide input to application 708. User 710 may provide input in various ways including, but not limited to, pushing a button, turning a dial, pressing a soft-key, etc. If endpoint device 706 has an accelerometer and/or gyroscope, user 710 may provide input by moving or otherwise changing the position of endpoint device 706. Any of these inputs may be used to control remotely controlled apparatus 704. In some embodiments, application 708 may execute within a web browser. Whether or not application 705 is running within a web browser, application 705 may send a communication to an address registration server (as described above) to facilitate connection with other devices on the network.

In order to communicate, application 708 and/or application 705 may establish network communication channels, which may include a first socket configured to carry loss-sensitive data, and a second socket configured to carry loss-tolerant data, as described above. Applications 705, 708 may establish the communication channels and/or network sockets directly with each other, or may each establish a communication channel and/or network sockets with hub 702. If applications 705, 708 each establish a communication channel and/or network sockets with hub 702, then the communications and data sent between endpoint device 706 and remotely controlled apparatus 704 may be routed through hub 702.

Computing device 712 may execute application 714 within web browser 716. The opposite may also be true. Application 714 may be configured to collect and/or process data sent over the network by application 708 and/or application 705. In some embodiments, application 714 may be executed by other devices, such as hub 702, endpoint 706, remotely controlled apparatus 704, or any other device on the network, and may be executed with or without a web browser.

In operation, user 710 may enter input into application 708 in order to control remote control apparatus 704. Application 708 may then send data through the network (i.e. through the network sockets described above and/or through hub 702), which may be received by remote control apparatus 704. Application 705 may then process the data and respond by controlling remotely controlled apparatus 704. For example, if remotely controlled apparatus is a remotely controlled vehicle, the data may cause the car to move, turn on, turn off, stop, turn, etc. If the remotely controlled apparatus is a screen, the data may case the screen to display content, turn on, turn off, dim, brighten, etc.

As described above, loss-sensitive data may travel over a socket or sockets between endpoint device 706 and remotely controlled device 704 configured for loss-sensitive data, e.g. a TCP socket. Loss-sensitive data may include control data such as button presses, still images, acknowledgements, setup data, etc. Loss-tolerant data may travel over a socket or sockets between endpoint device 706 and remotely controlled device 704 configured for loss-tolerant data, e.g. a UDP socket. Loss-tolerant data may include streaming audio, streaming video, accelerometer or gyroscope data, etc. In some embodiments, application 705 may send streaming audio and/or video to application 708 and/or 714. The audio and/or video may be a real-time, heads-up display from remotely controlled apparatus 704. For example, if remotely controlled apparatus 704 is a toy car equipped with a roof camera and a microphone, application 705 may send streaming audio and/or video from the camera and microphone so that user 710 can see and hear the view from the car. The audio and/or video may be displayed by applications 708 and/or 714, for example.

Application 714 may collect and/or process 316 data from endpoint device 706 and or remotely controlled apparatus 704. The data may include any type of data sent back and forth between devices on the network. Although not shown, the system may include multiple remotely controlled apparatuses and endpoint devices all communicating over the network at the same time. Application 714 may collect and/or process the data sent over the network in order to provide statistics about the data and/or display 318 the processed data on a display. Application 714 may also provide statistics by sending the processed data to application 705 and/or 708.

For example, in some embodiments, the remotely controlled apparatuses may produce data from accelerometers, gyroscopes, GPSs, or other sensors, and may send data. Accordingly, application 714 may process data from the remotely controlled devices to determine and display a location, direction, and/or speed of each device. Application 704 may also collect and display data about the location, identity, and other information about the endpoint devices. By collecting and displaying the information, application 714 may provide feedback to the user 710 and enhance the operation of remotely controlled apparatus 704.

Operation of the Embodiments

The following example illustrates the operation of some embodiments of the present invention. Browser application 14 may be an application executing within web browser 16, which may be executing on host device 12. Browser application 14 sends a communication with the public network address of host device 12 to server 34.

Application 22 may be an application for communicating with and controlling game content displayed by an application, and may be executing on endpoint device 18. Application 22 may send a communication to server 34 with the public and private network addresses of endpoint device 18.

Server 34 may determine that application 22 and browser application 14 are compatible applications executing on devices connected to the same local network. If so, server 34 may send the private network address of endpoint 18 to browser application 14 to facilitate connectivity between the two.

Browser application 14 and application 22 may then communicate with each other over private network 24, and may modify the security policy of web browser 16 to allow for two way communication between browser application 14 and application 22.

Browser application 14 and application 22 may then establish a loss-sensitive socket connection (e.g. a TCP connection) and a loss-tolerant socket connection (e.g. a UDP connection), and reduce network latency by sending loss-sensitive data over the loss-sensitive socket connection, and loss-tolerant data over the loss-tolerant socket connection.

One skilled in the art will recognize that the application, programs, methods, processes, etc., described herein may be implemented as software, firmware, hardware, scripts, or any other type of implementation for execution by a processor.

The present disclosure makes reference to various block diagrams and flowcharts. One skilled in the art will recognize that the order and configuration of components in the block diagrams and steps in the flowcharts are not limitations and are provided for illustration only. Various appropriate configurations of components and devices, and various orders and sequences of operation may fall within the scope of the claims.

It will be understood that synonymous terms in the claims (e.g. terms such as effectuate, create, open, connect, actualize, produce, etc.) may be intended to have synonymous meaning. Different, but synonymous, terms in the claims may be used for clarity in identifying, for example, steps within a method claim or elements within an apparatus claim.

While the invention has been described in connection with the specific embodiments thereof, it will be understood that it is capable of further modification. Furthermore, this application is intended to cover any variations, uses, or adaptations of the invention, including such departures from the present disclosure as come within known or customary practice in the art to which the invention pertains.

What is claimed is:

1. A method of controlling a remotely controlled apparatus comprising:

running, by a computing device coupled to a computer network, an application within a web browser;

executing, by a remotely controlled apparatus in communication with the computer network, a program designed to control actions of the remotely controlled apparatus;

establishing, by the program, a first network connection for carrying loss-tolerant and loss-sensitive data between the remotely controlled apparatus and a network hub device in order to transmit, therebetween, data for controlling the remotely controlled apparatus;

creating, by a control application executing on an endpoint device, a second network connection for carrying loss-tolerant and loss sensitive data between the network hub device and the endpoint device in order to transmit, therebetween, data for controlling the remotely controlled apparatus;

transmitting, by the remotely controlled apparatus, the endpoint device, or both, loss-tolerant and loss-sensitive data over the first and second network connections for controlling the remotely controlled apparatus; and processing, by the application within the web browser, data for controlling the remotely controlled apparatus sent over the first and second network connections.

2. A method as set forth in claim 1 wherein the step of establishing includes connecting a first and second socket connection between the remotely controlled apparatus and the network hub, and the step of creating includes opening a first and second socket connection between the endpoint device and the network hub.

3. A method as set forth in claim 2 wherein:

the step of connecting includes carrying the loss-sensitive data over the first socket connection; and the step of creating includes carrying the loss-sensitive data over the first socket connection.

4. A method as set forth in claim 3 wherein the step of connecting and the step of creating further include effectuating a TCP connection.

5. A method as set forth in claim 2 wherein:

the step of connecting includes transmitting the loss tolerant data over the second socket connection; and the step of creating includes transmitting the loss-tolerant data over the second socket connection.

6. A method as set forth in claim 1 wherein the step of creating further include effectuating a UDP connection.

7. A method as set forth in claim 1 further comprising placing the network hub device in a location to extend range of operation between the remotely controlled apparatus and the handheld endpoint device.

8. A method as set forth in claim 1 wherein the step of processing further includes displaying processed data on a display coupled to the computing device.

9. A method as set forth in claim 1 further comprising sending, by the application executing within the web browser, a communication to an address registration server including a private network address of the computing device.

10. The method as set forth in claim 1 further comprising sending, by the program, the application executing on the endpoint device, or both, a communication to an address registration server including a public and private network address of the remotely controlled apparatus, the endpoint device, or both.

11. A system for controlling a remotely controlled apparatus comprising:
- a remotely controlled apparatus in communication with a computer network and designed to execute a program for controlling actions of the remotely controlled apparatus;
- a network hub configured to extend range of operation of the computer network and to establish a first network connection with the remotely controlled apparatus for carrying loss-sensitive and loss tolerant data for controlling the remotely controlled apparatus;
- an endpoint device designed to execute an application configured to establish a second network connection with the network hub for carrying loss-sensitive and loss-tolerant data, and to send loss-sensitive and loss-tolerant data over the first and second network connections in order to control the remotely controlled apparatus; and
- a computing device in communication with the network and configured to execute an application within a web browser in order to collect and process the data sent over the first and second network connections by the endpoint device and the remotely controlled apparatus so as to control the remotely controlled apparatus.

12. A system as set forth in claim 11 wherein at least one of the network connections includes a first and second socket connection.

13. A system as set forth in claim 12 wherein the first socket connection is configured to carry the loss-sensitive data.

14. A system as set forth in claim 13 wherein the first socket connection is a TCP connection.

15. A system as set forth in claim 12 wherein the second socket connection is configured to carry the loss-tolerant data.

16. A system as set forth in claim 15 wherein the second socket connection is a UDP connection.

17. A system as set forth in claim 11 wherein the computing device is further configured to display processed data on a display.

18. A system as set forth in claim 11 wherein the application executing within the web browser is further configured to send a communication to an address registration server including a private network address of the computing device.

19. A system as set forth in claim 11 wherein the program, the application executing on the endpoint device, or both are further configured to send a communication to an address registration server including a public and private network address of the remotely controlled apparatus, the endpoint device, or both.

* * * * *